(12) United States Patent
Onodera et al.

(10) Patent No.: US 6,442,146 B1
(45) Date of Patent: Aug. 27, 2002

(54) TIME-DIVISION MULTIPLE-ACCESS COMMUNICATION SYSTEM

(75) Inventors: Tetsuo Onodera, Kitakatsushika-gun; Hiroshi Usami, Yokohama; Akihiro Shibuya, Tokyo; Eimatsu Moriyama, Koganei; Kiyoshi Hamaguchi, Yokohama; Yoichi Saito, Wakayama; Tadashi Matsumoto, Yokosuka; Mitsuhiko Mizuno, Yokohama, all of (JP)

(73) Assignees: Sharp Kabushiki Kaisha, Osaka; Hitachi Ltd.; Mitsubishi Denki Kabushiki Kaisha, both of Tokyo; Communication Research Laboratory, Ministry of Posts and Telecommunications, Koganei; Nippon Telegraph And Telephone Corporation; NTT Mobile Communications Network, Inc., both of Tokyo; YRP Mobile Telecommunications Key Technology Research Laboratories Co. Ltd., Yokosuka, all of (JP)

( * ) Notice: Subject to any disclaimer, the term of this patent is extended or adjusted under 35 U.S.C. 154(b) by 0 days.

(21) Appl. No.: 09/075,249

(22) Filed: May 11, 1998

(30) Foreign Application Priority Data

May 12, 1997 (JP) ............................................. 9-121321

(51) Int. Cl.[7] .............................................. H04B 7/212

(52) U.S. Cl. ....................................... 370/321; 370/347

(58) Field of Search ................................. 370/337, 347, 370/345, 442, 321, 329, 437, 468, 465; 455/552, 553

(56) References Cited

U.S. PATENT DOCUMENTS 6,125,138 A * 9/2000 Kumagai ..................... 375/219
6,205,190 B1 * 3/2001 Antonio et al. ............. 375/346

FOREIGN PATENT DOCUMENTS

WO          96/14719          5/1996

OTHER PUBLICATIONS

Steele, et al., "Third Generation PCN and the Intellignet multimode Mobile Portable" Electrnoics & Communication Engineering Journal, Insitiution of Electrical Engineers, London, GB, vol. 5, No. 3, Jun. 1, 1993, pp. 147–156.

(List continued on next page.)

Primary Examiner—Wellington Chin
Assistant Examiner—Brenda Pham (57) ABSTRACT

The present invention is directed to a TDMA communication system which is adapted to different communication environments or prepares different communication environments and allows each mobile station to be set for working in any one of the different communication environments. The communication system commonly uses a TDMA format that has a fixed frame-length and a constant number of bits for each of the slots composing the frame. The communication environments have prepared respective sets of communication conditions, each set including a transmission power, a modulating method, the number of multiplexed signals, error-correction, an antenna gain, a frequency hopping value and a diversity value. At each mobile station and each base station, one of plural sets of communication conditions for respective environments is selected to establish communication with each other under the selected environment.

20 Claims, 5 Drawing Sheets

OTHER PUBLICATIONS

Del Re, et al., "The GSM Procedures in an Integrated Cellular/Satellite System" IEEE Journal on Selected Areas in Communicaitons, IEEE Inc., New your, vol. 13, No. 2, (1995).

Tomisato and Suzuki, "A high–speed digital mobile radio communication system by using multitransmitter signal transmission", 1995, IEICE society symposium B–386.

The ministry of Posts and Telecommunications, "Final report on research and study of an intelligent radio –wave–utilization", Apr. 1994.

Shirato et al., "A Combining Diversity DFE with Mode switching", 1996, IEICE society symposium B–463.

Sampei et al. "An analysis on the performance of variable symbol rate and modulation system", Technical report of IEICE. RCS94–64 (1994–09).

Suzuki and Hirade, "Capacity increase of TDMA mobile communication systems enhanced with interference cancelling equalizers (ICE)", 1995, IEICE society symposium B–276.

* cited by examiner

| ENVIRON-MENTS | | CELL RADIUS | TRANSMIS-SION POWER (PEAK) | ANTENNA GAIN (BS/MS) | MODU-LATING METHOD | REQUIRED CNR (NOTE 1) | CARRIER BIT RATE | USER RATE | SERVICE RATE |
|---|---|---|---|---|---|---|---|---|---|
| ENVIRON-MENT O (OFFICE) | | 30m | 80mW | 10dB/-6dB | 16QAM | 29dB | 6.144Mbps | 4.096Mbps | PRIMARY GROUP INTERFACE×2 |
| ENVIRON-MENT P (WALKING) | | 400m | 800mW | 10dB/-6dB | QPSK | 10dB | 3.072Mbps | 2.048Mbps | PRIMARY GROUP INTERFACE |
| ENVIRONMENT V (VEHICLE) | SHORT MACRO | 1.15km | 1.5W | 16dB/-6dB | 16QAM | 21dB | 768kbps | 512kbps | (2B+D)×4 |
| | | 3km | | 16dB/-6dB | QPSK | 10dB | 384kbps (NOTE 2) | 256kbps | (2B+D)×2 |
| | LONG MACRO | 10km | | 16dB/0dB | QPSK | 10dB | 192kbps (NOTE 2) | 128kbps | 2B+D |

NOTE 1: ARRAY COMBINING ADAPTIVE EQUALIZATION IS ADAPTED AS A TECHNIQUE FOR REDUCING CNR

NOTE 2: MULTI-CARRIER IS ALSO CONSIDERED

FIG.5

PATTERN UW
- CONTROL SLOT : "1" IS ADDED TO A PN PATTERN OBTAINED BY
  THE FOLLOWING PRIMITIVE POLYNOMIALS

UP    $X^6+X+1$   (INITIAL VALUE : 04octal representation)

DOWN  $X^6+X^5+1$ (INITIAL VALUE : 07octal representation)

- COMMUNICATION SLOT: 48 BITS SELECTED FROM THE PN PATTERN

```
                                - - - - UW PATTERN - - - -
UP                        I - CH  010010011100010111100101
INITIAL VALUE : 12(octal) Q - CH  010000011111101010110011

- - - - UW PATTERN - - - -
DOWN                      I - CH  010100111101000111001001
INITIAL VALUE : 64(octal) Q - CH  110011010101111110000010
```

FIG.6

TIME-DIVISION MULTIPLE-ACCESS COMMUNICATION SYSTEM

BACKGROUND OF THE INVENTION

The present invention relates to a communication system using a TDMA (Time-Division Multiple-Access) method and more particularly to a communication system which adapts to different communication environments or provides different communication environments for transmitting and receiving signals.

The highly-advanced information technology era has brought with it the increasing demand for systems and devices allowing users to conduct wireless (radio communication) telephone or data-communications in a variety of situations, e.g., during walking outdoor or moving on a vehicle or working in an office. The present rapid development of infrastructures for various kinds of communication systems such as tele-communications with cordless telephones, portable telephones and local-area networks (LAN) radio-communications makes it possible for any one to communicate with any other person any time at any place.

However, many infrastructures have incompatible systems that require the use of specially designed terminals, preventing terminals from being used in common between the systems. For example, two representatives of TDMA communication systems, i.e., Personal Digital Cellular system (PDC) and Personal Handy-phone system (PHS) are incompatible and use different radio-frequencies, transmission power values, a number of slots per frame, bit rates, methods for coding and decoding audio signals and so on.

The incompatibility of the communications systems requires users to use different devices (PHS, PDC, Pagers, and so on) specially designed for respective systems to make wireless (radio communication) telephone or data-communications during walking from a vehicle or from an office. This is inconvenient for users. A terminal that can realize functions of two different systems may be manufactured with an increased size because it must contain many processing circuits that cannot be commonly used.

SUMMARY OF THE INVENTION

Accordingly, the present invention is directed to provide a TDMA communication system which adapts to different communication environments or prepares different communication environments for communications between mobile stations and base stations and allows each mobile terminal to conduct radio-communication at different transmission rates under different environments.

(1) An object of the present invention is to provide a TDMA communication system for executing communications between mobile stations and a base station using a TDMA method, wherein a TDMA format that has a constant time of a frame length and a constant number of bits in each of slots composing a frame is used as a common-use communication data format and each of the mobile and base stations is provided each with a communication device for processing communication signals based on the TDMA format, which device can operate in any one of plural different Communication environments designated by selecting a corresponding one of prepared sets of environmental communication conditions each including a transmission power value, a modulation method, the number of multiplexed signals and an error-correction method.

(2) Another object of the present invention is to provide a TDMA communication system as mentioned (1) above, which is characterized in that communications between the mobile stations and the base station are made by means of radio communication in a selected communication environment with the prepared conditions including additional conditions such as an antenna gain, a diversity method and frequency hopping.

(3) Another object of the present invention is to provide a TDMA communication system as mentioned (1) or (2) above, which is characterized in that priority of the different communication environment conditions are registered in a data base allowing the communication devices to select one of the communication environments according to the preset priority.

(4) Another object of the present invention is to provide a TDMA communication system as mentioned any one of (1) to (3) above, which is characterized in that the plural sets of different communication environment conditions are prepared for at least two of different environments comprising an office communication environment, a walking-speed communication environment, a mobile-running-speed communication environment and a satellite communication environment.

(5) Another object of the present invention is to provide a TDMA communication system as mentioned any one of (1) to (4) above, which is characterized in that the base station generates individually each set of the communication environment conditions and broadcasts the generated environmental information and each mobile station receives the broadcasted information and automatically selects a corresponding one of the prepared sets of the communication conditions according to the received information of communication-environment conditions.

(6) Another object of the present invention is to provide a TDMA communication system as mentioned any one of (1) to (4) above, which is characterized in that any of the prepared sets of the communication conditions can be manually selected and set.

(7) Another object of the present invention is to provide a TDMA communication system as mentioned any one of (1) to (6) above, which is characterized in that equalizing means with an adaptive equalization mode being changed according to a selected one of the communication environments are additionally provided for improving a bit error rate in a fading channel.

(8) Another object of the present invention is to provide a TDMA communication system as mentioned any one of (1) to (7) above, which is characterized in that the system is provided with a data base for controlling whole communication environments of mobile stations communicating with other mobile stations through the base station over a radio channel established between them and the data base is adaptable to changing channel connections from one environment to another different environment.

(9) Another object of the present invention is to provide a TDMA communication system as mentioned any one of (1) to (8) above, which is characterized in that the TDMA format is a format that can be commonly used by a personal handy-phone system (PHS).

PREFERRED EMBODIMENTS OF THE INVENTION

Preferred embodiments of the present invention will be described below in detail with reference to accompanying drawings.

Figure 1:
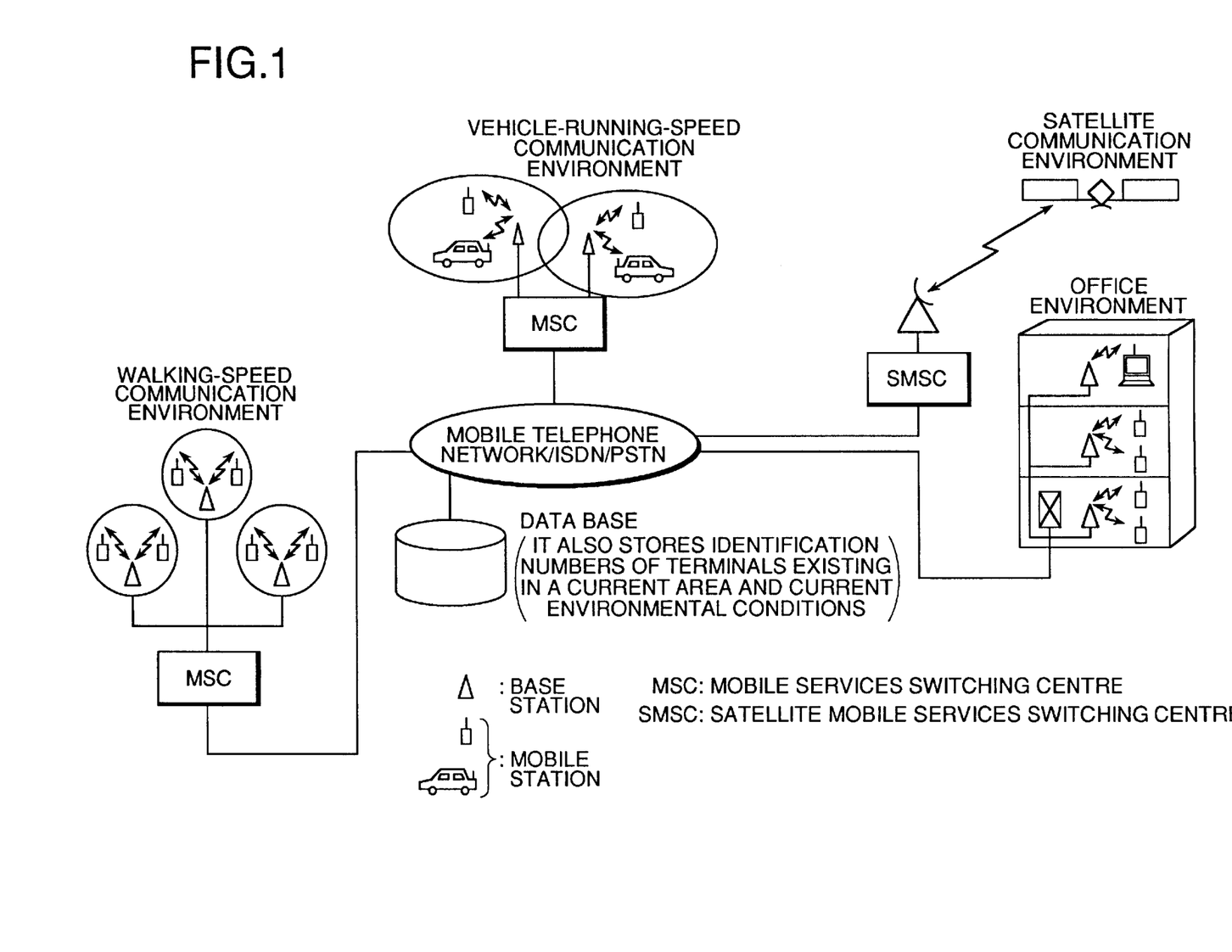
FIG. 1 is illustrative of a structure of a whole TDMA communication system embodying the present invention.

FIG. 1 depicts a structure of a TDMA communication system according to the present invention.

As shown in FIG. 1, the system provides respective communication environments such as an office communication environment, a walking-speed mobile communication environment, a vehicle-running-speed mobile communication environment and a satellite communication environment, all of which are connected with each other through a communication network. There is shown an example of the TDMA communication system wherein the system of the vehicle-running-speed environment includes the system of the walking-speed environment with mobile stations (i.e., the latter system without any modification of the preset conditions can be a component of the former system).

The system according to each of the communication environments has a mobile-exchange function, a base-station function and a mobile-station function as its components. Each base station and each mobile station have a transmitter-receiver set for executing the system operations.

The communication network interconnecting the system in respective communication environment includes a data base containing records and certificates of identification numbers of mobile terminals existing within the service area, the current conditions of environment for the terminals, classes of the terminals, and so on. Accordingly, each mobile terminal can adapt to each communication environment when moving from one environment to another different environment.

Figure 2:
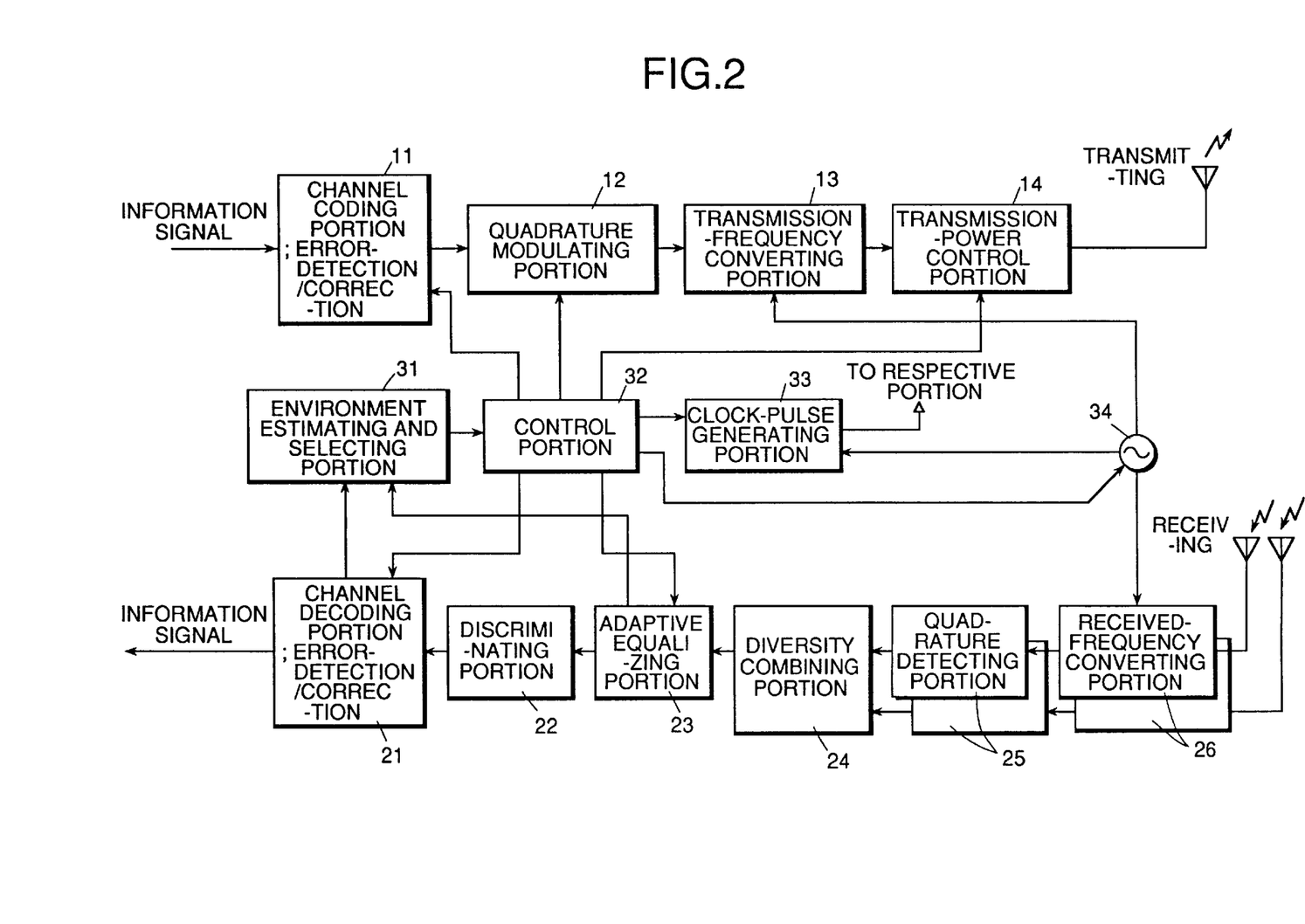
FIG. 2 is a construction diagram of a transmitter-receiver which is a component of the TDMA communication system according to the present invention.

FIG. 2 depicts an exemplified structure of a transmitter-receiver of a mobile station that is a component of the TDMA communication system according to the present invention.

The transmitter-receiver is provided with a channel coding portion (including an error-detection/correction coding portion) 11 for encoding information signals from a sound encoding/decoding codec (not shown) and a data portion (not shown), a quadrature modulating portion 12, a transmission-frequency converting portion 13, a transmission-power control portion 14, a frequency synthesizing portion 34, a clock-pulse generating portion 33, a received-frequency converting portion 26, a quadrature detecting (demodulating) portion 25, a diversity combining portion 24, an adaptive equalizing portion 23, discriminating portion 22, a channel decoding portion (including an error-detection/correction portion) 21, an environment estimating and selecting portion 31 and a control portion 32.

In the transmitter side, the channel coding portion 11 encodes an information signal to form required TDMA frames in accordance with the channel. The quadrature modulator portion 12 orthogonally modulates the coded signal. Then the transmission-frequency converting portion 13 through the frequency synthesizing portion 34 converts the modulated signal into a required radio-frequency signal to be transmitted over the network. The transmission-power control portion 14 controls transmission power of the radio-frequency signal.

On the other hand, in the receiver side, a radio-frequency signal is received through an antenna and is converted by the received-frequency converting portion 26 with the frequency synthesizing portion 34 to a signal that can be subject to baseband processing. The converted signal is orthogonally demodulated by the quadrature demodulating portion 25.

In the shown embodiment, there are pairs of the received-signal converting portion 26 with the quadrature detecting (demodulating) portion 25, either one pair that yields a communication route with the better quality signal is selected by the diversity combining portion 24. The adaptive equalizing portion 23 equalizes a waveform of the signal and the discriminating portion 22 outputs a binary digital signal. The channel decoding portion 21 decodes the digital signal to obtain a necessary information signal.

The control portion 32 controls the operations of the portions and the whole communication system at predetermined timing using timing pulses generated from the clock-pulse generating portion 33.

The environment estimating and selecting portion 31 generates a signal for setting one of communication environments based on a manual selection of the predetermined conditions, automatic selection of information from the base station or estimation of the transmission channel (route). According to the signal outputted from the environment estimating and selecting portion 31, the control portion 32 selects a modulating method by changing the signal point for channel coding, selects an error-detection/correction method for the channel coding portion 11 and the channel decoding portion 21 and changes a number of multiplexing signals by changing a frequency dividing ratio of the clock-pulse generating portion 33. The control portion 32 can control the transmission power control portion 14 to control a transmission-power value and the adaptive equalizing portion 23 to select an adaptive equalizing method. The control portion 32 can also control the frequency hopping by changing a preset value of the frequency synthesizer 34 and controls the diversity selecting portion 24 to select a diversity route.

The following description relates to a frame structure according to a TDMA format which is used as a data communication format featuring the TDMA communication system of the present invention.

Figure 3:
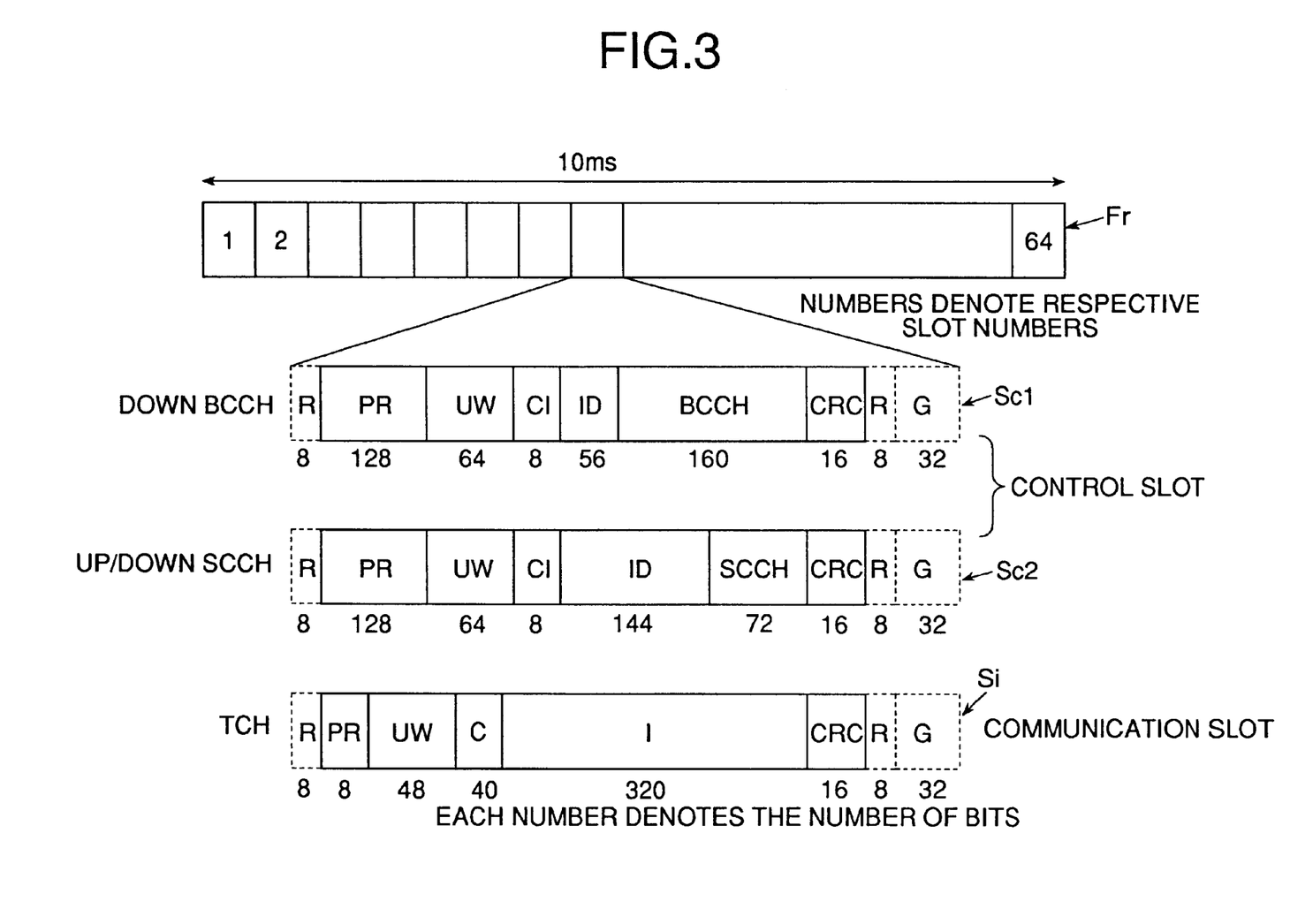
FIG. 3 is illustrative of an exemplified structure of a TDMA frame and slots, which is used in a TDMA communication system according to the present invention.

FIG. 3 shows an exemplified structure of a TDMA frame to be used in the channel coding portion 11 shown in FIG. 2. The frame has a constant frame length, a variable number of multiplexed slots and a variable modulation method, which is adaptable to use in different environments or at different user rates.

As shown in FIG. 3, a frame-structure Fr having a constant frame length of 10 ms and is composed basically of slots for control (control slots) of down BCCH Sc1 and up/down SCCH Sc2 respectively and slot for communication (communication slot) TCH Si.

Communication environments are prepared with conditions preset at the base station. The transmitter-receiver terminal of each mobile station can be adaptable to any one of the prepared environments, which is selected by connecting a channel in an environment selected from a variable range of digital modulation method QPSK/16 QAM at the quadrature modulator portion 12 and the multiplexing number of 4 to 64 according to a user rate of 128 kbps to 4.096 Mbps and a constant number of bits in each slot. In FIG. 3, a ramp bit is denoted by character R, a preamble PR, a unique word UW, channel identifier CI, a control bit C, an information bit I, a CRC check Bit CRC and guard bit G.

The number of bits in every slot is 480 (constant). A basic service rate signal 2B+D of the ISDN (Integrated Service Digital Network) can be easily transmitted by setting an I-to-C ratio in the communication slot Si at 8:1 and by making a user information transmitting portion 2B (2B=64 kbps×2=128 kbps) and a control information transmitting portion D (D=16 kbps) correspond to I and C respectively.

Figure 5:
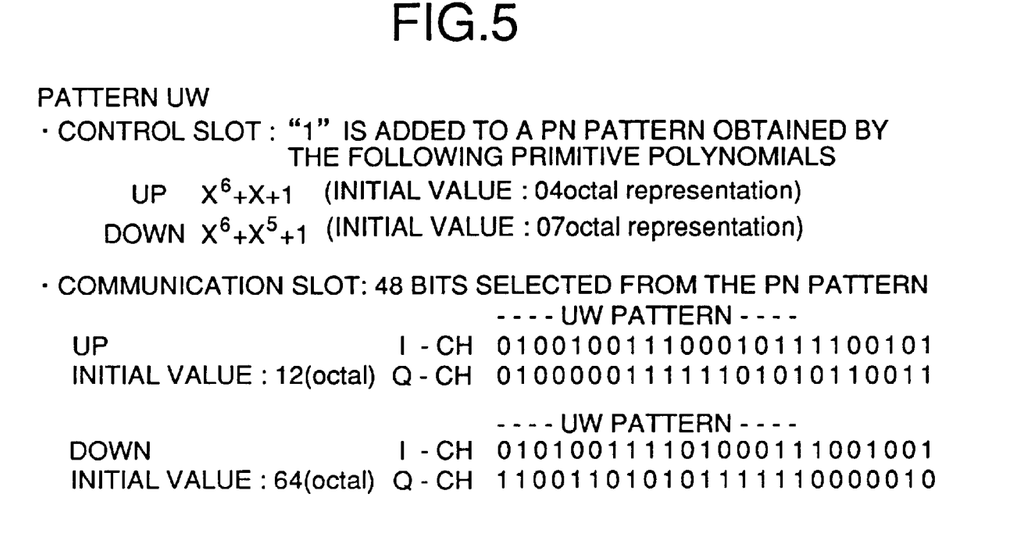
FIG. 5 depicts an example of a unique word pattern in construction of slots shown in FIG. 3.

FIG. 5 shows an example of the unique word in the slot structure shown in FIG. 3.

Figure 4:
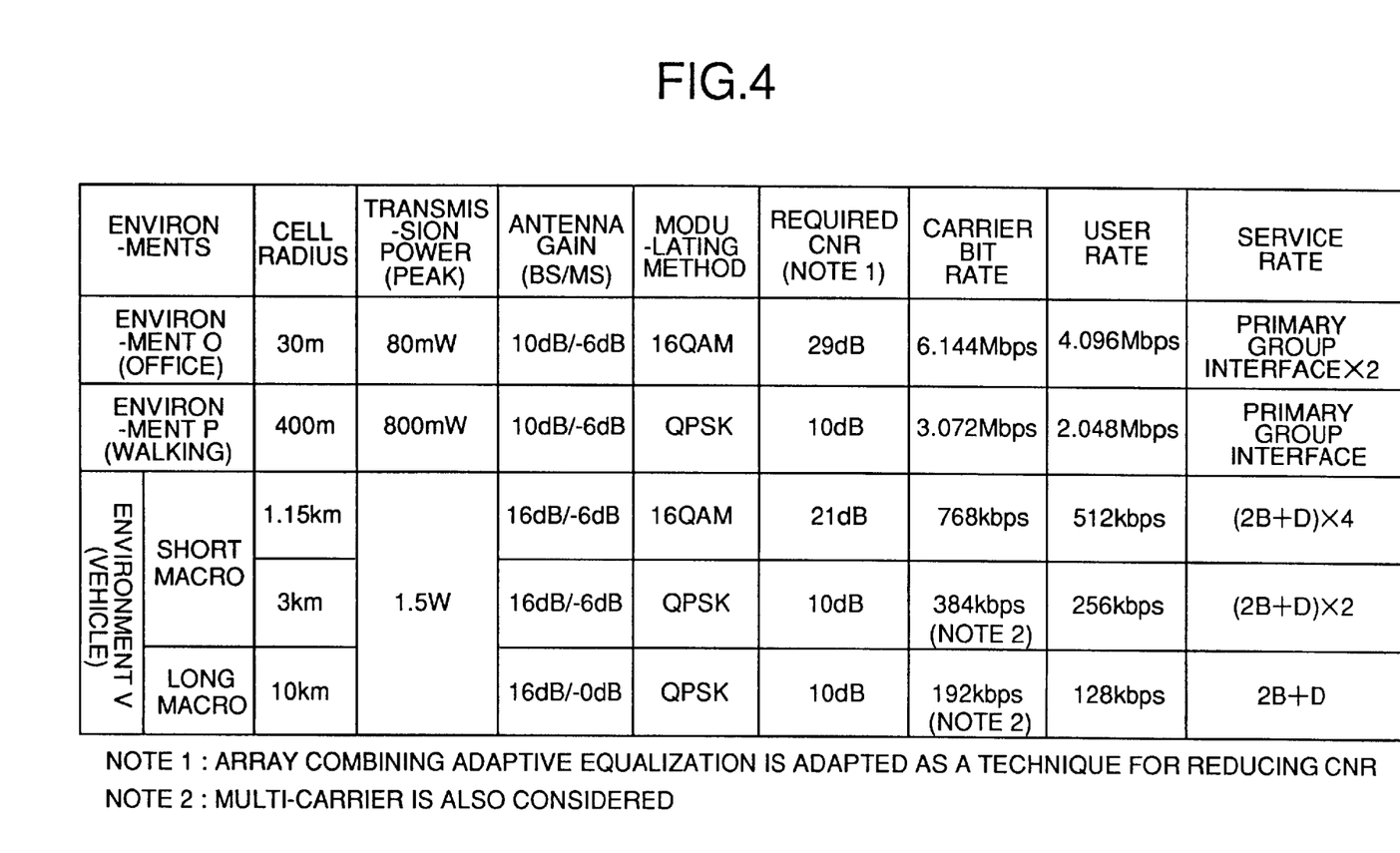
FIG. 4 depicts an example of specifications on respective environments created by the TDMA communication system according to the present invention.

FIG. 4 shows an exemplified technical specification of respective environments in which the TDMA communication system according to the present invention must work.

The operation of the TDMA communication system according to the present invention, which includes the mobile station provided with the transmitter-receiver and working with the TDMA format frame in respective environments having the specifications shown in FIG. 4, will be described below:

As shown in FIG. 4, an environment P (walking) provides 64 slots per frame (10 ms) at a maximum user rate of 2.048 Mbps and adopts a modulating method QPSK while an environment V provides 4 slots per frame (10 ms) at a maximum user rate of 128 kbps and adopts the modulating method QPSK.

It is possible to use the processing circuit of the system in common for different user-information transmitting rates by changing the number of slots per frame at a constant number (480) of bits per slot. This can be realized by changing the clock of the hardware depending on a user-information transmitting rate.

Although the above embodiment is described with the frame length of 10 ms, it can also work at the frame-length of, e.g., 5 ms to ensure compatibility of the system with PHS (Personal Handy Phone System e.g. RCR-STD 28). Accordingly, application of the method according to the present invention can facilitate miniaturizing the terminal devices.

On the other hand, a bit rate of carriers used for communication between the base station and the mobile station varies depending on the user-information transmitting rate as shown in FIG. 4.

Different radii of service areas and different maximal rates of information transmission must be realized depending upon different communication environments (i.e., an office environment, a walking-speed environment, a vehicle running-speed environment, a satellite environment, and so on). Therefore, each base station is provided with equipment that has different transmission power values, antenna gains and carrier bit rates in accordance with the different environments.

The base station has a broadcasting channel (BCCH) for always braodcasting control information at different carrier bit rates. The mobile station can previously know a transmission frequency, a carrier bit rate and a modulating method of signals from the base station.

The mobile station receives control information over the broadcasting channel (BCCH) and is placed under the control of the system constructed on the conditions indicated by the control information. The control information of the BCCH contains other information for the mobile station other than the carrier bit rate and the modulating method.

Accordingly, the mobile station can know a possible communication mode from the BCCH received from a certain base station. The user at a mobile terminal (station) can select a desired communication environment, i.e., a base station which provides the desired environment. The mobile station can also know which environments (i.e., base stations) are possible to use by scanning the broadcast channels from base stations existing in the service area where the mobile station moves.

With the user's request, the mobile station can automatically select in a programmed procedure a base station where it is waiting for connection with another mobile station. The above-mentioned function for selecting a base station can be realized by previously registering the priority of base stations producing different communication environments and by selecting a suitable one according to the registered priority.

The location of the mobile station is registered in the selected base station wherein the mobile station is in waiting state.

TDMA/TDD (Time Division Duplex) system provides operations modes to be used for communication that may have a very high correlation of propagation state between an uplink and a downlink when the frame length is sufficiently short. Therefore, the system can adopt an adaptive modulation method that changes a modulation method and a bit rate per slot instantly with the change in the transmission state by estimating instant CNR and a spread of a phase lag (refered to Technical Report of IEICE RCS94-64).

Generally, an initial call negotiation between a base station and a mobile station determines the operating mode for communication, in which the base station and the mobile station work at a constant modulation method and a constant bit rate while the call is maintained therebetween.

The required CNR/CIR value must be reduced since they may have a considerable influence on a bit rate, a cell radius and a required transmission power.

The reduction of the required CNR/CIR value in the TDMA communication system according to the present invention can be realized by applying any one of the following known methods:

High-speed transmission at a time from a plurality of stations (4-branch diversity):

This method enables transmission with a transmission power of 10 W at a bit rate of 1 Mbps in a cell having a radius of not less than 2 km. (Tomisato and Suzuki, "A High-speed digital mobile radio communication system by using multitransmitter signal transmission", 1995, IEICE society symposium B-386)

Interference conceling equalization (ICE) for improvement of CIR:

This method can expand the system capacity for accommodating subscribers twice as much as PDC by making common use of the same frequency by two users in the same sector.

(Suzuki and Hirade, "Capacity increase of TDMA mobile communication systems enhanced with interference cancelling equalizers (ICE)", 1995, IEICE society symposium B-276).

Dynamic Channel Allocation

The simulation test results show that the efficiency of using frequencies is increased by dynamic channel allocation rather than fixed channel allocation, for example, 2.5 to 3 times by an ACCA method and 2 times by a segregation method. The ministry of Posts and Telecommunications, "Final report on research and study of an intelligent radio-wave-utilization", April 1994).

Adaptive Modulation

A system capacity can be increased by adaptively changing a QPSK/16 QAM rate in the range from 1 to ⅛ according to CIR values at the periphery and the center of a cell.

(Sampei et al. "An analysis on the performance of variable symbol rate and modulation level adaptive modulation system", Technical report of IEICE RCS94-64 (1994-09)).

The adaptive equalizing portion 23 in the example of the transmitter-receiver of FIG. 2 can use the following types of equalizers:

An adaptive equalizer used in QPSK may be, for example, a combined type diversity decision feed back equalizer (DFE) that is featured by a saved capacity of its memory necessary for operations and signal processing. (Shirato et al., "A Combining Diversity DFE with Mode-switching", 1996, IEICE societysymposium B-463).

Figure 6:
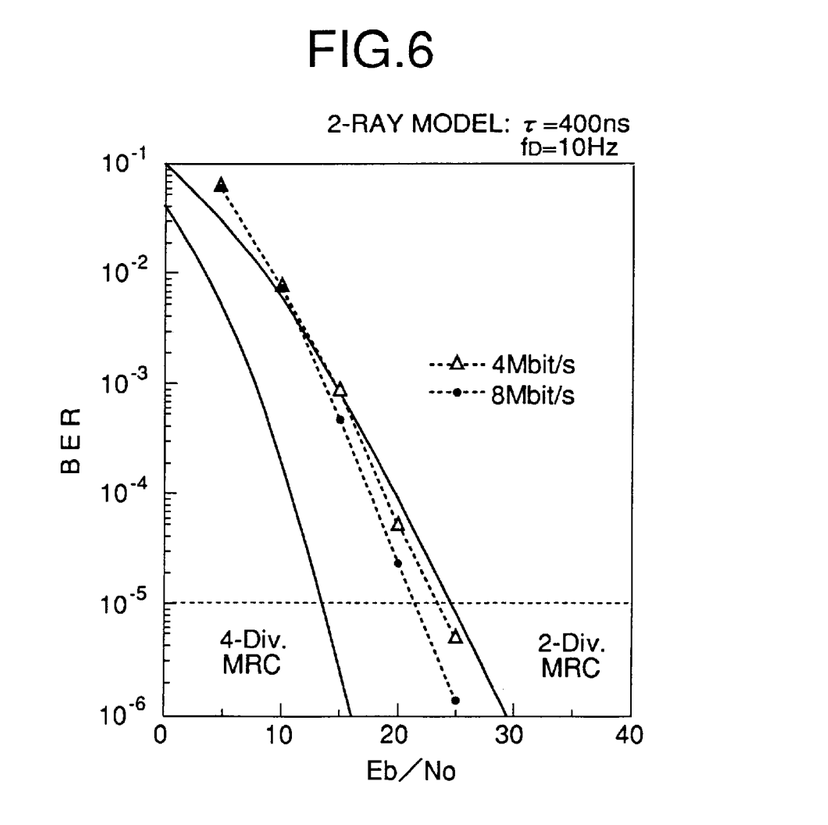
FIG. 6 depicts an example of BER characteristics obtained by an array combining type adaptive equalizer used for 16 QAM.

An adaptive equalizer used in 16QAM may be a known type equalizer that has, by way of example, attained data shown in FIG. 6. FIG. 4 shows, by way of example, technical data of the system in which these means (including the array combining adaptive equalization) are applied, which data includes a cell radius, a transmission power, an antenna gain, a modulation method, a required CNR, a carrier bit rate, a user rate.

On-Off control of the adaptive equalizers to save the power consumption of the system may be realized in such a way that CRC and RSSI (Received signal strength indication) are checked and the equalizer is turned on only if an error occurs with an intensive signal.

Although the TDMA communication system according to the present invention was described above by way of an example with radio communication, the present invention is not restricted thereto and can be of—course applied to cable communication, e.g., a fiber optics communication system if it allows terminal stations to work by selecting one of different communication environments.

Advantageous effects according to the present invention are as follows:

(1) In the TDMA communication system according to the present invention, each mobile terminal can conduct communications in a plurality of different environments or at different transmission rates, thus eliminating the need for using different mobile terminals for respective different infrastructures as conventional systems require.

(2) In addition to the advantageous effect of (1) mentioned above, an optimal mobile communication system can be constructed by using radio frequency as means for transmitting data signals.

(3) In addition to the advantageous effect of (1) or (2) mentioned above, different communication environments overlaid in areas can be selected in an order of priority, thus making it possible to control usable links at increased efficiency.

(4) In addition to the advantageous effect any one of (1) to (3) mentioned above, each mobile terminal can work in any one of the different communication environments such as an office environment, a walking-speed environment, a vehicle running-speed environment and a satellite environment.

(5) In addition to the advantageous effect any one of (1) to (4) mentioned above, connection of a channel between a mobile terminal and a base station is automatically conducted by each mobile terminal that receives broadcast data of generated communication environments from the base station and sets corresponding conditions according to the received data to connect itself to the base station.

(6) In addition to the advantageous effect any one of (1) to (4) mentioned above, each mobile terminal can be selectively set by hand to conditions necessary for communication with a base station, thus realizing simple construction of the terminal in comparison with that of the terminal of claim 4. This also enables the terminal to be faster connected to the base station.

(7) In addition to the advantageous effect any one of (1) to (6) mentioned above, a bit-error-rate in a fading channel can be improved, thus increasing the accuracy of communications.

(8) In addition to the advantageous effect any one of (1) to (7) mentioned above, each mobile terminal can continue the communication when it moves from one area into another area of different communication environment.

(9) In addition to the advantageous effect of any one of (1) to (8) mentioned above, the communication system ensure compatibility with PHS.

What is claimed is:

1. A TDMA (Time Division Multiple Access) communication system for communicating between mobile stations and a base station using a TDMA method, comprising a TDMA format that has a constant time of a frame length and a constant number of bits in each of slots composing a frame is used as a common-use communication data format and the mobile stations and the base station is provided each with a communication device for processing communication signals based on the TDMA format, which device can operate in any one of a plurality of different communication environments designated by selecting a corresponding one of prepared sets of communication environment conditions each set including a transmission power value, a modulation method, a number of multiplexed signals and an error-correction method.

2. A TDMA communication system as defined in claim 1, wherein communications between the mobile stations and the base station are made by means of radio communication in a selected communication environment with the prepared communication environment conditions including additional conditions comprising at least one of an antenna gain, a diversity method, and frequency hopping.

3. A TDMA communication system as defined in claim 1, wherein priority of the different communication environment conditions are registered in a data base allowing the communication devices to select one of the communication environments according to the preset priority.

4. A TDMA communication system as defined in claim 1, wherein the plural sets of different communication environment conditions are prepared for at least two of different environments comprising an office communication environment, a walking-speed communication environment, a mobile-running-speed communication environment and a satellite communication environment.

5. A TDMA communication system as defined in claim 1, wherein the base station generates individually each set of the communication environment conditions and broadcasts information concerning the generated communication environment conditions and each mobile station receives the broadcasted information and automatically selects a corresponding one of the prepared sets of the communication conditions according to the received information concerning to communication environment conditions.

6. A TDMA communication system as defined in claim 1, wherein any of the prepared sets of the communication conditions can be manually selected and set.

7. A TDMA communication system as defined in claim 1, wherein an equalizer with an adaptive equalization mode being changed according to a selected one of the communication environments is additionally provided for improving a bit error rate in a fading channel.

8. A TDMA communication system as defined in claim 1, wherein the system is provided with a data base for controlling whole communication environments of mobile stations and the data base is adaptable to changing channel connections from one environment to another different environment.

9. A TDMA communication system as defined in claim 1, wherein the TDMA format is a format that can be used in common with a personal handy-phone system.

10. A TDMA (Time Division Multiple Access) communication system for communicating between units using a TDMA method, the system comprising:

a signal having a TDMA format that has a constant time of a frame length and a constant number of bits in each of a plurality of slots comprising a frame, wherein said TDMA format is used as a common-use communication data format;

wherein each of the units is provided with a communication device for processing communication signals based on the TDMA format; and wherein the communication device can operate in any one of a plurality of different communication environments designated by selecting a corresponding one of prepared sets of communication environment conditions, wherein each of the sets comprise at least one of a transmission power value, a modulation method, a number of multiplexed signals and an error-correction method.

11. The TDMA communication system as defined in claim 10, wherein communications between the units are made by means of radio communication in a selected communication environment with the prepared communication environment conditions including additional conditions comprising at least one of an antenna gain, a diversity method and frequency hopping.

12. The TDMA communication system as defined in claim 10, wherein priority of the different communication environment conditions are registered in a database allowing the communication device to select one of the communication environments according to a preset priority.

13. The TDMA communication system as defined in claim 10, wherein the sets of different communication environment conditions are prepared for at least two of different environments comprising an office communication environment, a walking-speed communication environment, a mobile-running-speed communication environment, and a satellite communication environment.

14. The TDMA communication system as defined in claim 10, wherein a base unit generates individually each set of the communication environment conditions and broadcasts information concerning the generated communication environment conditions and wherein each mobile unit receives the broadcasted information and automatically selects a corresponding one of the prepared sets of the communication conditions according to the received information concerning to communication environment conditions.

15. The TDMA communication system as defined in claim 10, wherein
    any one of the prepared sets of the communication conditions can be manually selected and set.

16. The TDMA communication system as defined in claim 10, wherein an equalizer with an adaptive equalization mode that is changed according to a selected one of the communication environments is additionally provided for improving a bit error rate in a fading channel.

17. The TDMA communication system as defined in claim 10, wherein the system is provided with a database for controlling whole communication environments of mobile units and the database is adaptable to changing channel connections from one environment to another different environment.

18. The TDMA communication system as defined in claim 10, wherein the units are designed for at least one of a radio communication system, a cable communication system, and a fiber optic communication system.

19. The TDMA communication system as defined in claim 10, wherein the constant time of the frame length is 10 ms and the constant number of bits is 480 bits.

20. The TDMA communication system as defined in claim 10, wherein the modulation method comprises at least one of 16 QAM and QPSK and a user data rate is selected from a group consisting of 4,096 Mbps, 2.048 Mbps, 512 kbps, 256 kbps, and 128 kbps.

* * * * *